(12) United States Patent
Saxena et al.

(10) Patent No.: US 9,009,628 B2
(45) Date of Patent: Apr. 14, 2015

(54) METHOD AND SYSTEM FOR PROCESSING INFORMATION FED VIA AN INPUTTING MEANS

(75) Inventors: Kaushal Saxena, Panchsheel Ajmer Rajasthan (IN); Ashutosh Saxena, Gujarat (IN)

(73) Assignee: Infosys Limited (IN)

( * ) Notice: Subject to any disclaimer, the term of this patent is extended or adjusted under 35 U.S.C. 154(b) by 676 days.

(21) Appl. No.: 12/788,460

(22) Filed: May 27, 2010

(65) Prior Publication Data

US 2011/0231801 A1 Sep. 22, 2011

(30) Foreign Application Priority Data

Mar. 22, 2010 (IN) .............................. 743/CHE/2010

(51) Int. Cl.
*G06F 3/0482* (2013.01)
*G06F 3/033* (2013.01)
*G06F 3/0488* (2013.01)
*G06F 21/36* (2013.01)
*G06F 21/83* (2013.01)

(52) U.S. Cl.
CPC ............ *G06F 3/033* (2013.01); *G06F 3/04883* (2013.01); *G06F 21/36* (2013.01); *G06F 21/83* (2013.01)

(58) Field of Classification Search
CPC ..... G06F 3/017; G06F 3/0488; G06F 3/0482; G06F 3/01; G06F 3/018
USPC .......................................................... 715/765
See application file for complete search history.

(56) References Cited

U.S. PATENT DOCUMENTS

| | | | |
|---|---|---|---|
| 7,833,099 B2* | 11/2010 | Sato et al. ........................ | 463/37 |
| 8,237,681 B2* | 8/2012 | Stephanick et al. ........... | 345/173 |
| 2007/0097076 A1 | 5/2007 | Gross | |
| 2010/0127982 A1* | 5/2010 | Van Meeteren ................ | 345/163 |

* cited by examiner

*Primary Examiner* — Namitha Pillai
(74) *Attorney, Agent, or Firm* — Cantor Colburn LLP

(57) ABSTRACT

A method for processing information fed by a user via an inputting means is provided. The method enables, firstly, receiving a set of directional elements via a user interface. The set of directional elements represent textual or non-textual information fed by the user. Secondly, the method enables interpreting the set of directional elements. The set of directional elements are identified as a combination of motion of the inputting means on the user interface and one or more inputs from the inputting means. Further, the method enables converting the directional elements into a sequence and translating the sequence into the textual or non-textual information using a mapping format. The mapping format corresponds to a predetermined mapping format or a new mapping format. Finally, the method enables rendering the textual or non-textual information on the user interface in the form of one or more symbols.

21 Claims, 7 Drawing Sheets

| Direction | Buttons | Clicks | Directional Elements (E) | Keyboard Layout(K) | Mapping Percentage | Input density(I) |
|---|---|---|---|---|---|---|
| D | B | N | D*B*N | A-Z\|a-z\|0-9\| special characters | E/K*100 | |
| 4 | 2 | 4 | 32 | 94 | 34 | <0.5 |
| 8 | 2 | 4 | 64 | 94 | 68 | 0.5<I<1 |
| 8 | 3 | 4 | 96 | 94 | 102 | 1 |
| 8 | 3 | 5 | 120 | 94 | 128 | >1 |

Table 1

| Direction | Buttons | Clicks | Directional Elements (E) | Keyboard Layout(K) | Mapping Percentage | Input density(I) |
|---|---|---|---|---|---|---|
| D | B | N | D*B*N | A-Z\|a-z\|0-9\| special characters | E/K*100 | |
| 4 | 2 | 4 | 32 | 94 | 34 | <0.5 |
| 8 | 2 | 4 | 64 | 94 | 68 | 0.5<I<1 |
| 8 | 3 | 4 | 96 | 94 | 102 | 1 |
| 8 | 3 | 5 | 120 | 94 | 128 | >1 |

Table 1

200

| d1 | d2 | d3 | d4 | u1 | u2 | u3 | u4 |
|---|---|---|---|---|---|---|---|
| a | b | C | d | e | f | g | h |
| r1 | r2 | r3 | r4 | l1 | l2 | l3 | l4 |
| i | j | K | l | m | n | o | p |
| D1 | D2 | D3 | D4 | U1 | U2 | U3 | U4 |
| q | r | s | t | u | v | w | x |
| R1 | R2 | R3 | R4 | L1 | L2 | L3 | L4 |
| Y | Z | 1 | 2 | 3 | $ | % | ^ |

Table 2

500

METHOD AND SYSTEM FOR PROCESSING INFORMATION FED VIA AN INPUTTING MEANS

FIELD OF THE INVENTION

The present invention relates generally to processing information fed to a computing unit via an input device and more specifically to a method and system for securely processing information fed to a computing unit by a user via combination of inputting means motion and various inputs generated by the inputting means.

BACKGROUND OF THE INVENTION

Security of user's personal information is becoming a growing concern as the information is increasingly being placed on the internet or on a personal computer using various input devices such as keyboard, mouse, touchpad, biometric capturing devices etc. For example, using a keyboard, user can directly enter password, credit card numbers, debit card numbers, personal identification numbers (PINs) while accessing a secure context such as a bank website or in general by typing in an editor document. However, nowadays, various hardware and software techniques are employed to hack such information. For example, in case of physical keywords using which text information such as characters, numbers etc., are entered, key logging devices and key logging software are used to store the information into memory (permanent or volatile) files which can then be traced to extract the information. Key logging devices are usually small devices that can be fixed to the keyboard, or placed within a cable or computer itself to store information. Further, by using various rootkit technologies such as masking in user mode, and masking in kernel mode, key loggers cannot be averted from being detected manually or by an antivirus program. Examples of key logging software may include, a system hook which intercepts notification that a key has been pressed, a cyclical information keyboard request from the keyboard, a filter driver or any other dedicated program which is written in high level language like C, Basic, etc. designed to track and log keystrokes etc.

To overcome the abovementioned problems, virtual keyboards may be used as information is fed via a mouse or touchpad which may prevent logging and tracking of key presses. However, mouse movements and mouse click positions can be recorded by using mouse loggers. These click positions if simulated on a similarly positioned virtual keyboard by a hacker will reveal the key presses and the information which is fed. To overcome mouse logger's issues a virtual keyboard can be randomly laid out so that information logged cannot be retraced. But this random layout further slows down a user because for pressing a particular key he has to find out the modified key location on the screen. Further, since the speed of entering information using a virtual keyboard is usually very slow, an onlooker may be able to comprehend the information which is being fed. Furthermore, many novice users users are particularly subjected to the difficulty in securely feeding information as an onlooker can easily make out while the information is being fed.

In light of the abovementioned disadvantages, there is a need for a system and method which would facilitate a user to feed textual or non-textual information quickly and in a secure manner using an inputting means. There is a need for a system and method which can translate directional movements of the inputting means coupled with various inputs generated using the inputting means by the user for interpreting the fed information. In addition, there is a need for a system and method which can convert the signal into relevant textual or non textual information randomly by facilitating the user to create different translation formats.

SUMMARY OF THE INVENTION

A method for processing information fed by a user via an inputting means is provided. The method comprises, firstly, receiving a set of directional elements via a user interface. The set of directional elements represent textual or non-textual information fed by the user. Secondly, the method comprises interpreting the set of directional elements. The set of directional elements are identified as a combination of motion of the inputting means on the user interface and one or more inputs from the inputting means. Further, the method comprises converting the directional elements into a sequence and translating the sequence into the textual or non-textual information using a mapping format. The mapping format corresponds to a predetermined mapping format or a new mapping format. Finally, the method comprises rendering the textual or non-textual information on the user interface in the form of one or more symbols.

In an embodiment of the present invention, the one or more symbols comprise at least one of: asterisk, dollar, ampersand and any other symbol or character. In an embodiment of the present invention, the textual information is represented by at least one of: alphanumeric characters, wildcard string, special characters and a combination of special characters and alphanumeric characters of a keyboard. In an embodiment of the present invention, the textual information represents at least one of: password, account information, personal identification number, logging credentials and any other confidential or non-confidential information related to the user. In another embodiment of the present invention, the non-textual information is represented by at least one of: icon representing shortcuts to applications for closing, an active window, switching between windows, restarting, shutting down windows, starting a movie player, and/or icons representing computer programs for editing pictures in picture viewer, and audio in sound editors. In an embodiment of the present invention, the mapping format uniquely associates the set of directional elements to textual information represented by one or more characters of the keyboard. In another embodiment of the present invention, the mapping format uniquely associates the set of directional elements to non-textual information represented by one or more characters of the keyboard.

In an embodiment of the present invention, the method further comprises firstly, receiving a new mapping format created by the user. The new mapping format represents an alternate manner of mapping the one or more directional elements with various textual and non-textual information. Secondly, the method comprises linking the new mapping format to the user. Finally, the method comprises storing the new mapping format.

In an embodiment of the present invention, interpreting the directional elements comprises identifying position of a graphical pointer on the user interface corresponding to the motion of the inputting means. Further, interpreting the directional elements comprises identifying at least one of: one or more mouse clicks, depressing of mouse buttons, one or more mouse button events, one or more screen events, and invocation of a timer corresponding to the one or more inputs from the inputting means. In an embodiment of the present invention, the position of graphical pointer on the user interface is determined by dividing the plane of cursor motion on the user interface into one or more segments. In another embodiment of the present invention, interpreting the directional elements comprises identifying position of a graphical pointer on the user interface corresponding to the motion of the inputting means. Further, interpreting the directional elements comprises identifying at least one of: one or more tapping via a touchpad, one or more screen events, and invocation of a timer corresponding to the one or more inputs from the inputting means.

In an embodiment of the present invention, converting the set of directional elements into a sequence comprises grouping the set of directional elements received from the user. The grouping is performed according to the order in which the set of directional elements are fed by the user. In another embodiment of the present invention, converting the set of directional elements into a sequence comprises the step of grouping the set of directional elements received from the user in a predetermined order. In yet another embodiment of the present invention, converting the set of directional elements into a sequence comprises the step of converting the directional elements to an ungrouped sequence when each of the directional elements is exclusively associated with alphabets, number, or special characters of the keyboard.

A system for processing information fed by a user via an inputting means is provided. The system comprises an inputting means and a motion capturing module. The motion capturing module is in communication with the inputting means and is configured to facilitate the user to feed in textual or non-textual information via the inputting means. The motion capturing module comprises a user interface configured to receive a set of directional elements via the inputting means. The set of directional elements represent the textual or non-textual information. Further, the signal processing module is configured to interpret the set of directional elements. The set of directional elements are interpreted as a combination of motion of the inputting means on the user interface and one or more inputs from the inputting means. Furthermore, the signal processing module is configured to convert the set of directional elements into the textual or non-textual information employing a predetermined mapping format or a new mapping format and render the textual or non-textual information on the user interface in the form of one or more symbols.

In an embodiment of the present invention, the signal processing module is configured to interpret the set of directional elements as a combination of position of graphical pointer on the user interface and one or more inputs from the inputting means.

In an embodiment of the present invention, the system further comprises a mapping module configured to store the predetermined mapping format in a file or a database. In another embodiment of the present invention, the user interface is further configured to facilitate the user to create a new mapping format and store the new mapping format in the mapping module.

In an embodiment of the present invention, the inputting means comprises at least one of: a mouse having at least one button, a touchpad, a trackball, a beam pointer, a graphics tablet, a touchscreen, a joystick, a pointing stick, a gamepad, a remote control and any pointing device or motion sensor capturing device. In another embodiment of the present invention, the inputting means comprises at least one of: a finger inputting information on a touch screen monitor and a human body motion detectable by a laser motion sensor.

The present invention is described by way of embodiments illustrated in the accompanying drawings wherein:

BRIEF DESCRIPTION OF THE ACCOMPANYING DRAWINGS

DETAILED DESCRIPTION OF THE INVENTION

A method and system for processing information fed by a user to a computing unit via a combination of movement of inputting means and various inputs generated using the inputting means is described herein. Further, the invention provides for a method and system that facilitates translating direction of motion of the inputting means and the various inputs into the fed information based on a translation format. The invention further provides for a method and system that facilitates the user to either use a predetermined translation format or alter the translation format each time the user enters the information to the computing unit. The invention facilitates mapping random motion of the inputting means combined with one or more inputs to the various alphanumeric characters and symbols of the keyboard for presenting textual or non-textual information. Further, the invention provides for interpreting relative position of pointers to obtain textual or non-textual information.

In various embodiments of the present invention, the motion of the inputting means when captured on the basis of an event can be translated into direction w.r.t. a surface or plane or 3D. For example, up, down, right and left can be denoted as directions for a mouse cursor on a screen. These directions if grouped in a sequence can be meaningfully translated into any kind of information. The event which triggers the recording of directions can be triggered manually by a user such as mouse clicks, key presses etc. or automatically by the system capturing the information (e.g. a timer, change in working screen, e.g. maximizing, minimizing or restoring a screen etc.). The complexity and randomness in triggering of event can be altered easily by a user or system in such a way that any kind of logging of mouse motion or keyboard presses will not aid in revealing the information that is fed.

The following disclosure is provided in order to enable a person having ordinary skill in the art to practice the invention. Exemplary embodiments are provided only for illustrative purposes and various modifications will be readily apparent to persons skilled in the art. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

The present invention would now be discussed in context of embodiments as illustrated in the accompanying drawings.

Figure 1:
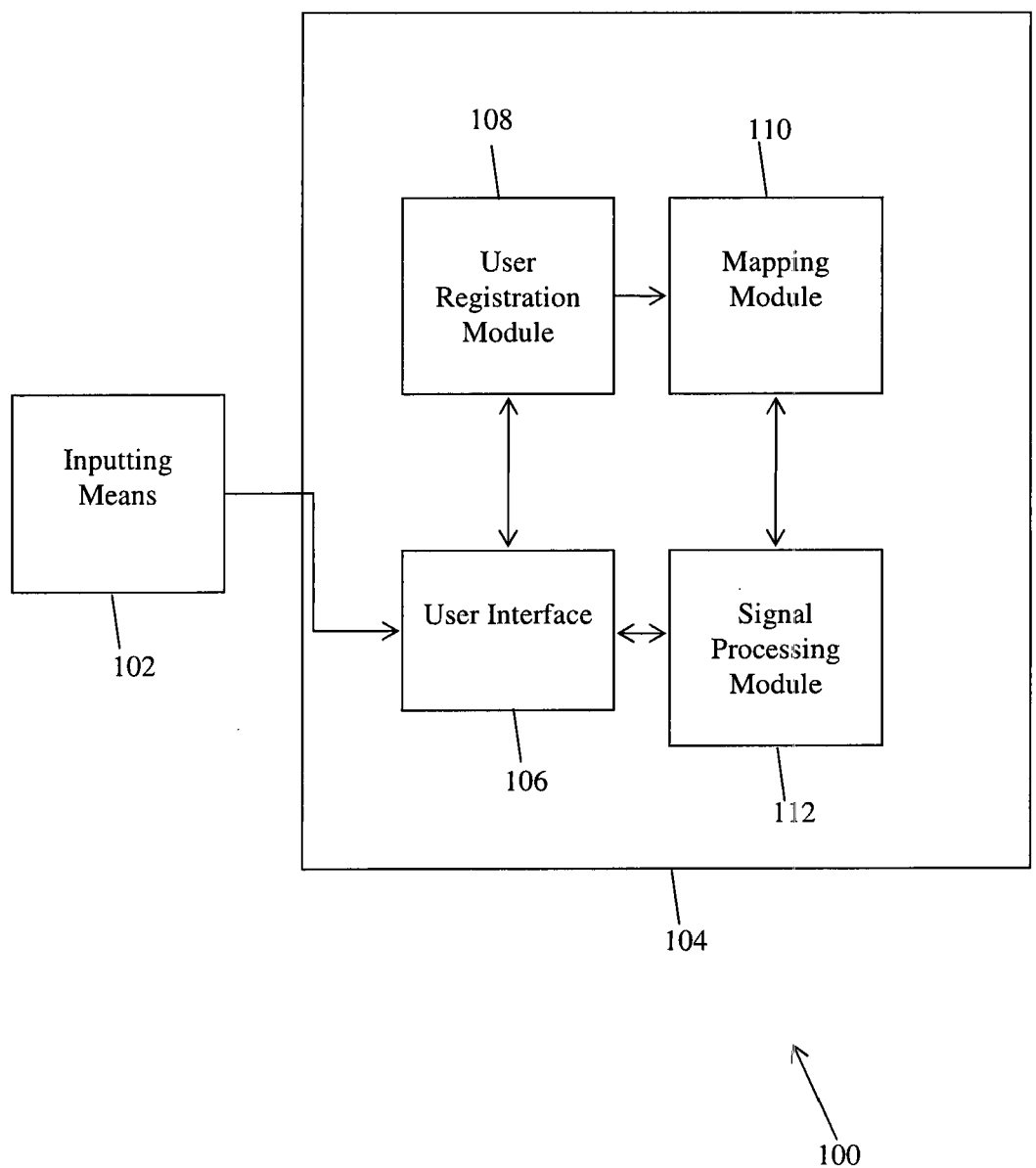
FIG. 1 is a block diagram of a system for processing information fed by a user via an inputting means, in accordance with an embodiment of the present invention.

FIG. 1 is a block diagram of a system 100 for processing information fed by a user via an inputting means, in accordance with an embodiment of the present invention. In various embodiments of the present invention, the system 100 comprises an inputting means 102 and a motion capturing module 104. The motion capturing module 104 further comprises a user interface 106, a user registration module 108, a mapping module 110, and a signal processing module 112.

The inputting means 102 is a means which provides an interface to a user to input data to a computing unit (not shown). The inputting means 102 may be externally connected to the computing unit (not shown) or may be an integral part of the computing unit (not shown). Examples of inputting means 102 may include, but is not limited to, mouse, beam pointer, trackball, touchpad, graphics tablet, touchscreen, joystick, pointing stick, gamepad, remote control or any other pointing device or motion sensor capturing device. Further examples of inputting means 102 may include, but is not limited to, a finger inputting information on a surface such as a touch screen monitor to capture direction of motion of the finger on the surface and a human body motion which may be detected by a laser motion sensor. In an embodiment of the present invention, the inputting means 102 facilitates the user to enter confidential information such as passwords which may be textual or non textual information, by physical movement of the inputting means 102. The physical movement of the inputting means 102 results in a corresponding movement of a graphical pointer on a screen of the computing unit (not shown). The pointer movement is used to determine the direction of motion of the inputting means 102. In addition to the physical movement of the inputting means 102, the user provides one or more inputs via the inputting means 102 to enter the password.

In an exemplary embodiment of the present invention, movement of a mouse by the user results in corresponding movement of a cursor on the screen which is captured to determine the direction of motion of the mouse. In addition, one or more inputs are generated using the mouse via mouse button clicks, pressing down mouse buttons etc. to enter a password. A mouse with two buttons enabling at least two clicks from any button or a mouse with three buttons enabling at least four clicks from any button may be used. In another exemplary embodiment of the present invention, touchpad movement may be combined with mouse clicks to enter the password. In yet another exemplary embodiment of the present invention, mouse motion may be combined with speed of cursor to enter the password. In various embodiments of the present invention, the motion of the inputting means 102 along with the one or more inputs from the inputting means 102 as mentioned above is referred to as directional elements. Different combinations of inputting means motion and inputs represent different directional elements. The different directional elements are transmitted to the motion capturing module 104 as different signal type.

In various embodiments of the present invention, the motion capturing module 104 is an entity which facilitates to capture the directional elements transmitted via the inputting means 102. Further, the motion capturing module 104 facilitates to process the directional elements and interpret the information entered (e.g. password) by converting the directional elements employing a translation format.

In an embodiment of the present invention, the user interface 106 in the motion capturing module 104 may be a graphical user interface that facilitates the user to register with the system 100. The user interface 102 prompts the user to provide registration information such as username and/or contact details and/or any other identity descriptor for registering the user with the system 100 or accessing the system 100 if the user is already registered. The user interface 106 transmits the information to the user registration module 108 for registering the user with the system 100 or validating the information to facilitate the user to access the system 100.

In another embodiment of the present invention, the user interface 106 displays a translation format, e.g. a mapping format for facilitating the user to determine the format for translating the directional elements received via the inputting means 102 into alphanumeric characters or special characters as per a keyboard layout. The mapping format may be stored in the mapping module 110. The mapping module 110 is a software module which receives, processes and stores the mapping format in a file or a database.

In an exemplary embodiment of the present invention, the translation format represents a predetermined mapping format where predetermined directional elements are mapped to various alphanumeric characters and special characters of the keyboard. The directional elements may be transmitted using motion of a two button mouse coupled with one, two, three or four mouse clicks. The motion of the mouse may be represented by plane of cursor motion divided into one or more segments. For example, the one or more segments may represent a particular direction such as up (U), down (D), left (L) and right (R) on the screen. The predetermined mapping format may represent mapping of each of the cursor position coupled with the number of clicks to the capital letters A-Z, small letters a-z and the special characters of a keyboard.

In yet another embodiment of the present invention, the user interface 106 shall prompt the user to alter the predetermined mapping format into a new mapping format. In an exemplary embodiment of the present invention, the set of directional elements may be mapped to various keys of the keyboard in a different manner. In another exemplary embodiment of the present invention, different set of directional elements may be mapped to various keys of the keyboard in a different manner. The directional elements may be transmitted by motion of a two button mouse coupled with one, two, three or four mouse clicks. The motion of the mouse may be represented by plane of cursor motion being divided into one or more segments which may represent a particular direction such as up right (UR), right up (RU), right down (RD), down right (DR), down left (DL), left down (LD), left up (LU) and up left (UL) on the screen. The new mapping format may represent mapping of each of the cursor position coupled with the number of clicks to the capital letters A-Z, small letters a-z and the special characters of the keyboard.

In an embodiment of the present invention, the user registration module 108 receives and registers the altered mapping format associated with the user. The user registration module 108, then, transmits the mapping format to the mapping module 110. The user registration module 108 and mapping module 110 may be installed in a user device (not shown) as a client application or may be installed on a server (not shown).

In various embodiments of the present invention, the riser interface 106 captures the signal representing a set of directional elements from the inputting means 102 and transmits the signal to the signal processing module 112. The signal processing module 112 is a computing device which receives the directional elements from the user interface 106 and obtains a mapping format associated with the user from the mapping module 110. The mapping format may be a predetermined format or an altered format created by the user each time he accesses the system 100. The signal processing module 112 translates the directional elements into the required information (i.e. password) using the mapping format.

Figure 2:
FIG. 2 illustrates a table representing various combinations of inputs i.e. directional elements that can be mapped to various keys of the keyboard, in accordance with an exemplary embodiment of the present invention.

FIG. 2 illustrates a table 1 representing various combinations of inputs i.e. directional elements that can be mapped to various keys (i.e. A-Z, a-z, 0-9 and special characters) of the keyboard, in accordance with an exemplary embodiment of the present invention. The directional elements may be thirty two, sixty four, ninety six and one hundred twenty which is obtained by combining cursor direction, number of mouse buttons and number of mouse clicks. As shown in table 1, in an example, mouse with two buttons may be used and the cursor can be moved in four directions i.e. up (U), right (R), down (D) and left (L). In another example, as shown in table 1, the cursor can be moved in eight directions which is up right (UR), right up (RU), right down (RD), down right (DR), down left (DL), left down (LD), left up (LU) and up left (UL). Mouse with two or three buttons may be used which may have four or five clicks. Further, table 1 shows input density which may be defined as mapping percentage proportional to the directional elements as interpreted based on various inputs. All the inputs of a normal keyboard can be mapped if sufficient directional elements are applied. As shown, for the input density=1, direction of cursor movement is '8', number of mouse buttons is '3' along with at most 4 clicks from any mouse button.

Figure 3:
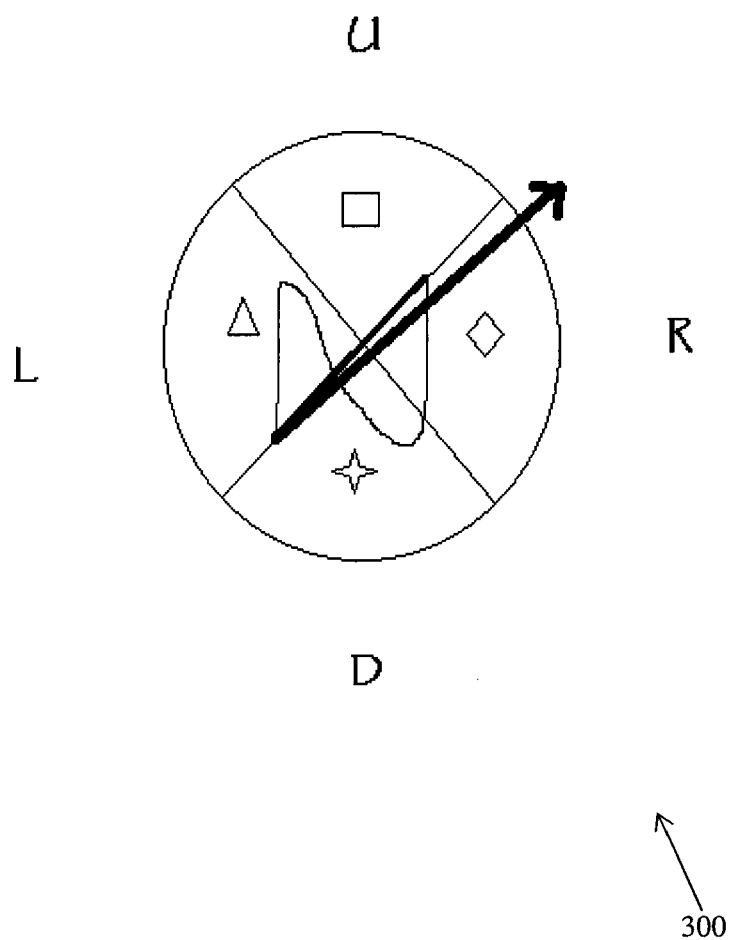
FIG. 3 illustrates cursor movement shown using a curve where the cursor can be moved in the four directions, in accordance with an exemplary embodiment of the present invention.

FIG. 3 illustrates cursor movement using a curve where the cursor can be moved in the four directions, in accordance with an exemplary embodiment of the present invention. Further, in case the direction of cursor movement cannot be determined when the cursor moves in a direction which is a median of two adjacent directions i.e. U and R, the actual direction may be obtained by tracing the trajectory of mouse motion till a valid instance of cursor direction is found. As represented by an arrow in the FIG. 3, the direction of cursor is determined to be R after retracing the path of the cursor.

Figure 4:
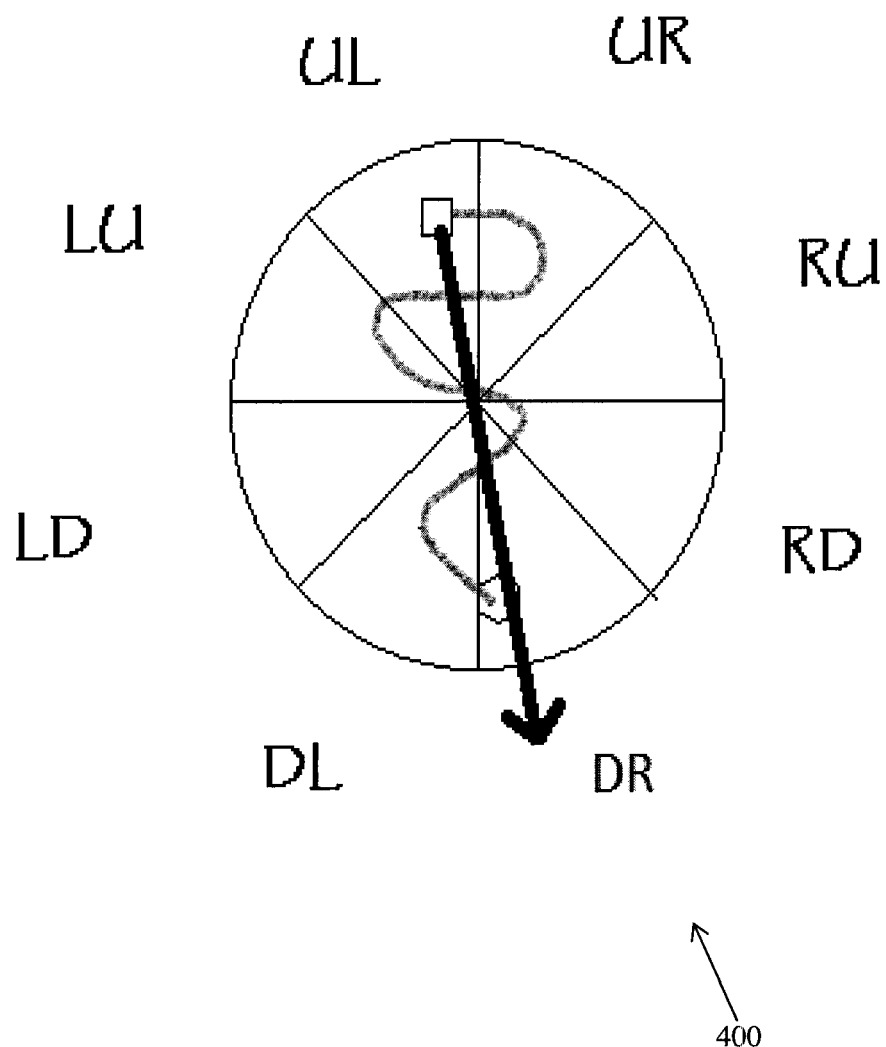
FIG. 4 illustrates eight cursor directions using eight quadrants of the circle, in accordance with an exemplary embodiment of the present invention.

FIG. 4 illustrates eight cursor directions using eight quadrants of the circle, in accordance with an exemplary embodiment of the present invention. As represented by an arrow, the cursor moves from a starting point to an ending point which may be determined as the DR position of the cursor.

Figure 5:
FIG. 5 illustrates another table which represents a mapping format for thirty two directional elements, in accordance with an exemplary embodiment of the present invention.

FIG. 5 illustrates table 2 which represents a mapping format for thirty two directional elements obtained by four cursor directions on the screen, two mouse buttons and four clicks, in accordance with an exemplary embodiment of the present invention. As shown the letter 'a' in the keyboard may be mapped to 'down' direction of the cursor on the screen and one click using the left mouse button. The directional element, in this case, may be represented by "d1". Further, the letter "q" in the keyboard may be mapped to "right" direction of the cursor on the screen and one click using the right mouse button. The directional element, in this case, may be represented by "D1". Further, the letter 'i' in the keyboard may be mapped to 'right' direction of the cursor on the screen and one click using the left mouse button. The direction element, in this case, may be represented by "r1". Similarly, other keys may be mapped to the directional elements.

Figure 6:
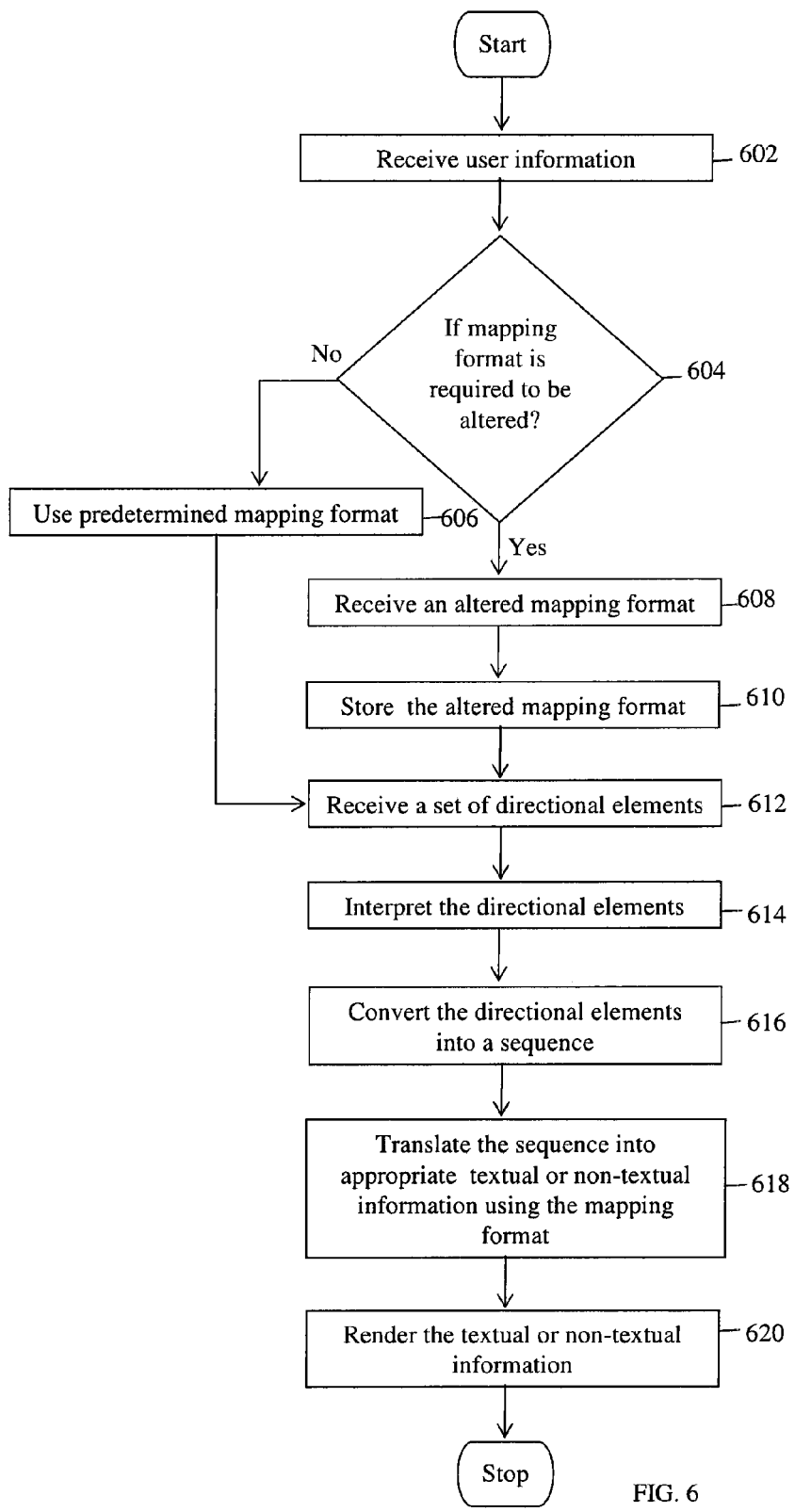
FIG. 6 is a flowchart for processing information fed by a user via an inputting means, in accordance with an embodiment of the present invention.

FIG. 6 is a flowchart for processing information fed by a user via an inputting means, in accordance with an embodiment of the present invention.

At step 602, user information is received. In an embodiment of the present invention, the user provides information such as name and contact details to register himself with the system. The user information is verified and the user is provided with the login details such as user name to access the system. In another embodiment of the present invention, the user provides login details such as user name to access the system if he is already registered.

At step 604, a check is performed to determine if mapping format is required to be altered. In an embodiment of the present invention, the user is provided with an option to determine if he wishes to change the mapping format. The mapping format represents a set of directional elements mapped to various keys on the keyboard. Directional elements represent a combination of various inputs generated from an inputting means and movement of the inputting means. The movement of inputting means may include movement of mouse, touchpad etc. The various inputs may include mouse clicks, pressing down of mouse button, tapping of touchpad etc.

At step 606, if it is determined that mapping format is not required to be altered, a predetermined mapping format is displayed on a user interface (e.g. FIG. 5).

At step 608, if it is determined that mapping format is required to be altered, a new mapping format created by the user is received. In an embodiment of the present invention, the user may create the new mapping format by determining an alternate manner in which the directional elements may be mapped to the various keys of a keyboard or to any non-textual information. In another embodiment of the present invention, the user may create the new mapping format by providing a different set of directional elements and determining an alternate manner in which the directional elements may be mapped to the various keys of a keyboard. At step 610, the mapping format is stored. In an embodiment of the present invention, the mapping format created by the user may be stored in a file or database and is linked to the user.

At step 612, one or more directional elements are received. In various embodiments of the present invention, the user provides information such as password, account information, logging credentials and other confidential or non-confidential information as a set of directional elements to the user interface. The information may include textual or non-textual information. The directional elements may include random motion of an inputting means coupled with one or more inputs from the inputting means. In an embodiment of the present invention, the directional elements may include a combination of mouse motion and mouse clicks. In another embodiment of the present invention, the directional elements may include mouse motion and depressing of mouse button. In another embodiment of the present invention, the directional elements may include mouse motion and mouse button event up. In an embodiment of the present invention, the directional elements may include mouse motion and mouse motion event down. In another embodiment of the present invention, the directional elements may include mouse motion coupled with change in a context such as change in a working screen (e.g. browser window). In another embodiment of the present invention, the directional elements may include a combination of mouse motion and invocation of a system event such as a timer. In an embodiment of the present invention, the directional elements may include movement of a cursor on the screen and tapping of a touchpad. In another embodiment of the present invention, the directional elements may be determined by one or more combinations of tapping of a touchpad and change in a context such as a working window. In yet another embodiment of the present invention, the directional elements may be determined by one or more combinations of tapping of a touchpad and invocation of a system event i.e. a timer. The touchpad may be a biologically living object such as a porous cell membrane or a non-living object. In various embodiments, various combinations of inputs from various inputting means may be used as directional elements to improve the complexity which in turn would enhance the security.

At step 614, the directional elements are interpreted. In various embodiments of the present invention, the directional elements are received as a signal and direction of motion of the inputting means are identified. Further, the one or more inputs from the inputting means such as mouse clicks, mouse button press, tapping of touchpad etc. are identified. The direction of motion of inputting means is identified by determining the position of cursor on screen as described with respect to FIGS. 3 and 4. Further, the one or more inputs are identified as events for capturing the motion of the inputting means. In an embodiment of the present invention, different directional elements may be employed by the user each time he enters information such as password.

At step 616, the directional elements are converted into a sequence. In an embodiment of the present invention, the position of cursor on screen that is identified is grouped along with the other inputs from the mouse such as clicks or mouse button press. In an embodiment of the present invention, the grouping may be performed in a predetermined order to form a sequence. In another embodiment of the present invention, the grouping may be performed according to the order in which the directional elements are fed by the user. For example, if the first position of cursor is 'down' and number of mouse click is 1 and the next position of cursor is 'right' and the number of clicks is 4, the sequence may be d1, r4. In yet another embodiment of the present invention, the directional elements may be converted to a sequence in an ungrouped manner. For example, an ungrouped sequence may be generated by employing a mouse with two buttons where the left button click is mapped with special characters of the keyboard. The right button click is mapped with numbers of the keyboard and directions of the mouse motion are mapped with alphabets of the keyboard.

At step 618, the sequence is translated into appropriate textual or non-textual information using the mapping format. In an embodiment of the present invention, the sequence may be translated into textual information or non textual information using the mapping format that is determined by the user as described above in steps 604, 606 and 608. Examples of textual information include, but are not limited to, alphanumeric character, wildcard string or special characters of the keyboard or combination of special characters and alphanumeric characters. Examples of non-textual information include, but are not limited to, picture, video, animation and sound. Further, the non-textual information can further be used to define an automated task flow to perform specific activities. An example of automated task flow may include a visual display comprising of pictures and sound which may be used for training an animal. Various combinations of touchpad inputs may be mapped with the pictures and sound. The touchpad inputs may be fed for obtaining the relevant pictures and sound for training the animal.

The mapping format may be retrieved from a mapping file or database and then used to translate the sequence into a textual or non-textual information.

At step 620, the textual or non-textual information is rendered. In an embodiment of the present invention, the translated textual or non-textual information may be rendered on the user interface in the form of one or more symbols. In an exemplary embodiment of the present invention, the one or more symbols may include asterisk, dollar, ampersand etc.

Figure 7:
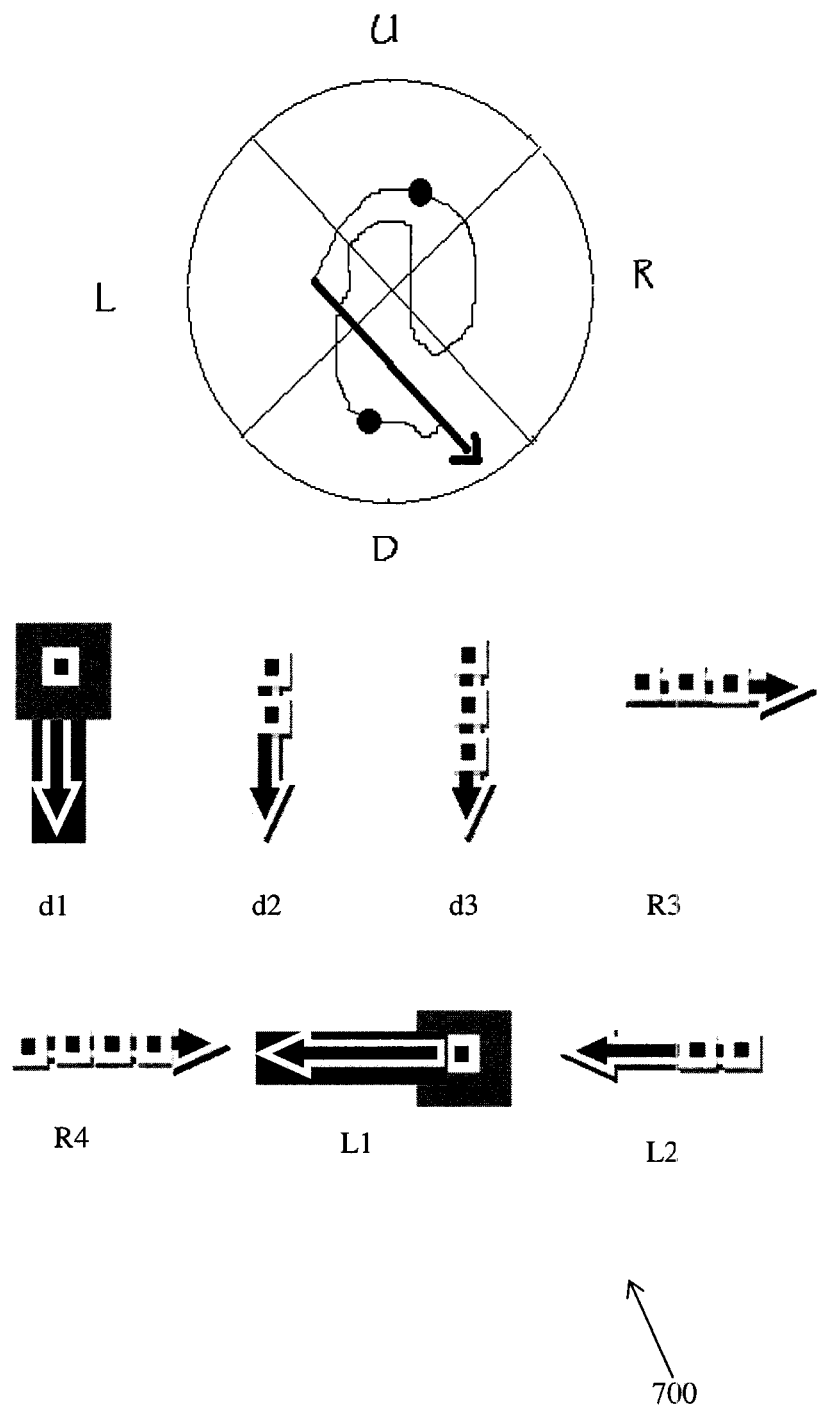
FIG. 7 illustrates a process of determining a password entered by the user using directional elements, in accordance with an exemplary embodiment of the present invention.

FIG. 7 illustrates a process of determining a password "abc123$" entered by the user using directional elements, in accordance with an exemplary embodiment of the present invention. As shown, the direction 'down' of cursor and a single mouse click is received and interpreted as directional elements. The directional elements are identified as 'd' and '1'. Further, the next directional elements are the direction 'down' of the cursor and two mouse clicks which is identified as 'd' and '2'. Similarly, the next directional elements are the direction 'down' of the cursor and three mouse clicks which is identified as 'd' and '3'. The directional elements next identified are 'L1' and where R and L represents right and left directions respectively and 3, 4, 1 and 2 represent the number of mouse clicks. The interpreted directional elements are, then, converted into a sequence d1 d2 d3 R3 R 4 L1 L2. The sequence is then translated into the text "abc123$" using the mapping format as shown in FIG. 5.

In another exemplary embodiment of the present invention, non-textual information may include an icon representing shortcuts to various applications such as application to close an active window, to switch between windows, to restart and shut down windows, to start a movie player. Further, the non-textual information may include various icons representing a computer program to edit pictures in picture viewer, edit audio in sound editors etc. Various directional elements may be fed which may be converted into a sequence and translated into the icons as per a mapping format. For example, a sequence such as DRLDR may be translated to the icon to start the movie player.

In an embodiment of the present invention, the conversion into a sequence may occur dynamically. In another embodiment of the present invention, the conversion into a sequence may occur after completion of password entry. In an embodiment of the present invention, the translation into textual or non-textual information may occur dynamically. In another embodiment of the present invention, the translation into textual or non-textual information may occur after completion of password entry.

The present invention may be implemented in numerous ways including as a apparatus, method, or a computer program product such as a computer readable storage medium or a computer network wherein programming instructions are communicated from a remote location.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention as defined by the appended claims.

We claim:
1. A method comprising:
   detecting a triggering event before a plurality of random directional elements are received via a user interface, the triggering event being dynamically configurable by the user to be at least one of an input from an inputting means and a system information input;

capturing, in response to detecting the triggering event, the plurality of random directional elements received via the user interface, each random directional element being a combination of a plurality of motion inputs and a plurality of non-motion inputs;

interpreting the captured plurality of random directional elements by converting the captured plurality of random directional elements into a sequence;

translating the sequence into textual or non-textual information using a mapping format comprising a plurality of user defined directional elements mapped to the textual and non-textual information, at least one of the plurality of user defined directional elements of the mapping format being defined by the user at a first pre-determined time, wherein at least a portion of the mapping format is updated by the user at a second pre-determined time; and rendering the textual or non-textual information on the user interface as one or more symbols.

2. The method of claim 1, wherein at least a portion of the mapping format is updated by the user by:

defining a different combination of a plurality of motion inputs and a plurality of non-motion inputs as the at least one user defined directional element; and mapping each of the at least one user defined directional element to one of an alphanumeric character, a wildcard string, a special character, and a combination of special characters and alphanumeric characters of a keyboard.

3. The method of claim 1, wherein the one or more symbols comprises at least one of: asterisk, dollar, ampersand and any other symbol or character.

4. The method of claim 1, wherein interpreting the captured plurality of random directional elements comprises:

identifying the plurality of motion inputs based on positional changes of a graphical pointer on the user interface corresponding to motion of the inputting means; and identifying the plurality of non-motion inputs based on detecting at least one of:

one or more mouse clicks, depressing of mouse buttons, and a plurality of key presses corresponding to one or more inputs from the inputting means.

5. The method of claim 4, wherein the position of graphical pointer on the user interface is determined by dividing the plane of cursor motion on the user interface into one or more segments.

6. The method of claim 1, wherein the textual information is represented by at least one of: an alphanumeric character, a wildcard string, a special character and a combination of special characters and alphanumeric characters of a keyboard.

7. The method of claim 6, wherein the mapping format uniquely associates the plurality of user defined directional elements to textual information represented by one or more characters of the keyboard.

8. The method of claim 1, wherein the non-textual information is represented by at least one of: an icon representing shortcuts to applications for closing an active window, switching between windows, restarting of windows, shutting down windows, starting a movie player, one or more icons representing computer programs for editing pictures in picture viewer, and one or more icons representing computer programs for editing audio in sound editors.

9. The method of claim 8, wherein the mapping format uniquely associates the plurality of user defined directional elements to the non-textual information represented by the one or more icons.

10. The method of claim 1, wherein the textual information represents at least one of: a password, an account information, a personal identification number, logging credentials and any other confidential or non-confidential information related to the user.

11. The method of claim 1, wherein converting the captured plurality of random directional elements into a sequence comprises the step of grouping the captured plurality of random directional elements received from the user, wherein the grouping is performed according to the order in which the plurality of random directional elements are fed by the user.

12. The method of claim 1, wherein converting the captured plurality of random directional elements into a sequence comprises the step of grouping the captured plurality of random directional elements received from the user in a predetermined order.

13. The method of claim 1, wherein converting the captured plurality of random directional elements into a sequence comprises converting the captured plurality of random directional elements to an ungrouped sequence when each of the directional elements is exclusively associated with alphabets, numbers, or special characters of the keyboard.

14. The method of claim 1, wherein the input from the inputting means includes a plurality of mouse clicks or a plurality of key presses; and further wherein the system information input includes at least one of a timer information, a dimensional change of a current display screen of the system, and restoration of a minimized display screen of the system.

15. The method of claim 1, wherein detecting the triggering event before the plurality of random directional elements are received via the user interface, the triggering event being dynamically configurable by the user comprises:

setting, by the user, a first triggering event comprising at least one of an input from an inputting means and a system information input, and detecting the first triggering event before a first set of random directional elements are received via the user interface at a first instance; and setting, by the user, a second triggering event comprising at least one an input from the inputting means and a system information input, the second triggering event being different from the first triggering event, and detecting the second triggering event before a second set of random directional elements are received at the user interface at a second instance.

16. The method of claim 1, further comprising:

providing the translated sequence to an application requiring credentials of the user if the translated sequence comprises textual information; and executing a workflow comprising one or more activities if the translated sequence comprises non-textual information.

17. A system comprising:

an inputting means; and a motion capturing module, in communication with the inputting means, configured to facilitate a user to feed in textual or non-textual information via the inputting means, wherein the motion capturing module comprises:

a user interface configured to:

capture a plurality of random directional elements received via the user interface in response to detection of a triggering event, the triggering event being detected before the plurality of random directional elements are received via the user interface, wherein the triggering event is dynamically configurable by the user to be at least one of an input from the inputting means and a system information input, and further wherein each random directional element is a combination of a plurality of motion inputs and a plurality of non-motion inputs; and a signal processing module configured to:

interpret the captured plurality of random directional elements by converting the captured plurality of random directional elements into a sequence;

translating the sequence into textual or non-textual information using a mapping format comprising a plurality of user defined directional elements mapped to the textual and non-textual information, at least one of the plurality of user defined directional elements of the mapping format being defined by the user at a first pre-determined time, wherein at least a portion of the mapping format is updated by the user at a second pre-determined time; and render the textual or non-textual information on the user interface as one or more symbols.

18. The system of claim 17, further comprising a mapping module configured to store the mapping format in a file or a database, wherein the mapping format uniquely associates the plurality of user defined directional elements to textual information and/or non-textual information.

19. The system of claim 17, wherein the inputting means comprises at least one of: a mouse having at least one button, a touchpad, a trackball, a beam pointer, a graphics tablet, a touchscreen, a joystick, a pointing stick, a gamepad, a remote control and any pointing device or motion sensor capturing device.

20. The system of claim 17, wherein the inputting means comprises at least one of: a finger inputting information on a touch screen monitor and a human body motion detectable by a laser motion sensor.

21. The system of claim 17, wherein the signal processing module is configured to interpret the captured plurality of random directional elements, wherein the captured plurality of random directional elements are interpreted as a combination of: the plurality of motion inputs comprising positional changes of a graphical pointer on the user interface corresponding to the motion of the inputting means, and the plurality of non-motion inputs comprising at least one of one or more mouse clicks, depressing of mouse buttons, and a plurality of key presses.

* * * * *